(12) United States Patent
Weil et al.

(10) Patent No.: US 10,826,302 B2
(45) Date of Patent: Nov. 3, 2020

(54) METHOD FOR EQUALIZING STATES OF CHARGE OF A PLURALITY OF BATTERY MODULES OF A BATTERY AND CORRESPONDING APPARATUS

(71) Applicant: Robert Bosch GmbH, Stuttgart (DE)

(72) Inventors: Thomas Weil, Simmozheim (DE); Paul Mielcarek, Stuttgart (DE); Tobias Alexander Beck, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 178 days.

(21) Appl. No.: 16/316,502

(22) PCT Filed: Jun. 27, 2017

(86) PCT No.: PCT/EP2017/065760
§ 371 (c)(1),
(2) Date: Jan. 9, 2019

(87) PCT Pub. No.: WO2018/010945
PCT Pub. Date: Jan. 18, 2018

(65) Prior Publication Data
US 2019/0245355 A1    Aug. 8, 2019

(30) Foreign Application Priority Data
Jul. 11, 2016    (DE) .................. 10 2016 212 564

(51) Int. Cl.
*H02J 7/00*    (2006.01)
*H02J 3/32*    (2006.01)
(Continued)

(52) U.S. Cl.
CPC .............. *H02J 7/0016* (2013.01); *H02J 3/32* (2013.01); *H02J 3/382* (2013.01); *H02J 7/0021* (2013.01); *H02J 7/35* (2013.01); *Y02E 70/30* (2013.01)

(58) Field of Classification Search
CPC ..... H02J 7/0016; H02J 7/0018; H01M 10/441
See application file for complete search history.

(56) References Cited

U.S. PATENT DOCUMENTS

2002/0171397 A1* 11/2002 Adrian ................ H01M 16/003
                                                320/119
2003/0097225 A1* 5/2003 Teruo ................. G01R 31/3648
                                                702/63
(Continued)

FOREIGN PATENT DOCUMENTS

DE    102012201404      8/2013
DE    102013214287      1/2014
(Continued)

OTHER PUBLICATIONS

International Search Report for Application No. PCT/EP2017/065760 dated Aug. 25, 2017 (English Translation, 2 pages).

*Primary Examiner* — Arun C Williams
(74) *Attorney, Agent, or Firm* — Michael Best & Friedrich LLP

(57) ABSTRACT

The present invention relates to a method for equalizing states of charge of a plurality of battery modules (20) of a battery (10). The method comprises identifying each of the battery modules (20) which is to be discharged by means of a load resistor (30) which is associated with the respective battery module for the purpose of equalizing the states of charge. The method comprises carrying out, for each battery module (20) or each identified battery module (20), a first evaluation, which is associated with the respective battery module, of its state of charge which occurs at a first time on a first day and/or of a first quantity of electrical energy and/or of a second quantity of electrical energy. An estimate for the first quantity of energy can be supplied by an energy conversion system to the battery (10) during the first day. An estimate for the second quantity of energy is supplied by the battery (10) to a load during the first day. The method comprises determining for each identified battery module (20), on the basis of the first evaluation which is associated with the respective battery module, whether a discharge time, at which the respective battery module (20) is discharged by means of the load resistor (30) which is associated with it, occurs during the first day.

12 Claims, 2 Drawing Sheets

(51) Int. Cl.
*H02J 3/38* (2006.01)
*H02J 7/35* (2006.01)

(56) References Cited

U.S. PATENT DOCUMENTS

| | | | | |
|---|---|---|---|---|
| 2005/0062458 A1* | 3/2005 | Koch | ................ | G01R 31/3842 |
| | | | | 320/132 |
| 2006/0022639 A1* | 2/2006 | Moore | ................ | H02J 7/0016 |
| | | | | 320/116 |
| 2009/0088994 A1* | 4/2009 | Machiyama | .......... | H01M 10/48 |
| | | | | 702/63 |
| 2011/0121785 A1 | 5/2011 | Iida et al. | | |
| 2014/0025214 A1 | 1/2014 | Ito et al. | | |
| 2014/0145678 A1 | 3/2014 | Erhart et al. | | |
| 2014/0067151 A1 | 5/2014 | Hwang | | |
| 2015/0145483 A1* | 5/2015 | Shinohara | ............. | H02J 7/0071 |
| | | | | 320/134 |
| 2018/0175660 A1* | 6/2018 | Hara | .................... | H02J 7/0068 |

FOREIGN PATENT DOCUMENTS

| | | |
|---|---|---|
| EP | 2083494 | 7/2009 |
| EP | 2418754 | 2/2012 |
| JP | 2013094033 | 5/2013 |
| WO | 2015014761 | 2/2015 |
| WO | 2015110592 | 7/2015 |

\* cited by examiner

METHOD FOR EQUALIZING STATES OF CHARGE OF A PLURALITY OF BATTERY MODULES OF A BATTERY AND CORRESPONDING APPARATUS

BACKGROUND OF THE INVENTION

The present invention relates to a method for equalizing states of charge of a plurality of battery modules of a battery which are connected in series, and an apparatus for carrying out such a method.

The prior art discloses a method for equalizing states of charge of a plurality of battery modules of a battery which are connected in series. Each of the battery modules has a plurality of battery cells which are connected in parallel. The battery is designed to supply a consumer with electrical energy and to store electrical energy which is generated by a stationary energy conversion system by converting renewable energy. For equalizing the states of charge, each battery module may be discharged via a load resistor associated with said battery module. For this purpose, for each battery module, each first difference associated with said battery module, between a voltage present at the respective battery module and a voltage present at another of the battery modules, is determined. Alternatively or in addition, for each battery module, a number of charging and discharging cycles, which the respective battery module has experienced since a time at which the respective battery module was last discharged via its associated load resistor up to the current time, is determined. In this case, each of the battery modules is detected, for which a first difference associated with said battery module exceeds a first voltage limit value, and/or the number of charge and discharge cycles experienced by it exceeds a first numerical limit value. Furthermore, each detected battery module is discharged via its associated load resistor until the first difference associated with said battery module and which exceeds the first voltage limit value is equal to zero or is negative. Such a method is disclosed in the document JP 2013/094033 A. A similar method is disclosed in the document US 2011/0121785 A1.

With respect to such a method, it is to be taken into account that each first difference associated with one of the battery modules is able to reach the first voltage limit value only after several charge and discharge cycles of the respective battery module. As a result, discharging of each battery module may take place via its associated load resistor at an unfavorable time. Such discharging of one of the battery modules may, for example, occur at a time of a day to be considered, at which the battery modules respectively have a high state of charge and at which the energy conversion system is not able to generate additional electrical energy and feed it to the battery. In this case, a portion of an amount of electrical energy generated by the energy conversion system on the day to be considered and stored in the battery is converted into heat or dissipated, without the battery supplying electrical energy to the consumer and without it still being possible to recharge the battery on the day to be considered. Instead of "dissipating" the aforementioned portion of the amount of energy, it would be more economical to use this portion of the amount of energy for supplying the consumer with electrical energy.

Another aspect is that at high values of the first voltage limit value and the first numerical limit value, deviations which occur between voltages present at the battery modules may become very large. These very large deviations result in a significant reduction of useful storage capacity of the battery. Infrequently repeating the discharging of the battery modules via the associated load resistors, for example, only after several hundred charge and discharge cycles, results in a reduction of the usable storage capacity of the battery. As a result, less energy can be stored temporarily in the battery.

SUMMARY OF THE INVENTION

According to the present invention, a method is provided for equalizing states of charge of a plurality of battery modules of a battery which are connected in series. The battery is provided for supplying a consumer with electrical energy and for storing electrical energy which is generated by a stationary energy conversion system via conversion of renewable energy. The energy conversion system is designed for converting renewable energy, for example, solar energy, into electrical energy. The method comprises a first, second, and third step. The first step comprises identifying each one of the battery modules which is to be discharged via an associated load resistor, for equalizing the charging states. The second step comprises a first evaluation, which is to be carried out for each battery module or each identified battery module at a first time of a first day and which is associated with the respective battery module, of the charging state of said battery module occurring at the first point in time, and/or of a first amount of electrical energy, and/or of a second amount of electrical energy. The first amount of electrical energy is that amount of electrical energy which is expected to be supplied by the battery to the consumer during the first day. The second amount of electrical energy is that amount of electrical energy which is expected to be able to be supplied by the energy conversion system to the battery during the first day. The third step comprises a determination which is to be carried out for each identified battery module, based on the first evaluation associated with said battery module, of whether a time of discharge, at which the respective battery module is discharged via its associated load resistor, occurs during the first day. Preferably, each battery module comprises a plurality of battery cells which are connected in parallel.

In a previously described method, it is decided, based on the first evaluation, which of the identified battery modules are discharged during the first day via the associated load resistors. Furthermore, it is decided, based on the first evaluation, which of the identified battery modules are not discharged via the associated load resistors during the first day. In other words, the charging states of the battery modules of the battery are equalized according to a novel operating mode of the battery modules, in which a suitable time of discharge is determined for each identified battery module, based on the first evaluation associated with said battery module. In this way, it is achieved that storage capacity of the battery is better utilized. Thus, an increase in the economy of the corresponding stationary energy conversion system is achieved.

In a previously described method, preferably, an identification feature, in particular an identifying number, of each identified battery module of which the time of discharge does not occur during the first day, is stored. In this way, each battery module of which the identification feature was stored may be immediately identified as a battery module which is to be discharged via its associated load resistor, on a second day immediately following the first day, on which a previously described method is repeated. According to the corresponding method to be carried out during the second day, it is then decided whether the time of discharge, of each battery module of which the identification feature was stored during the first day, occurs during the second day.

In a previously described method, any day of a calendar year may be selected as the first day.

Preferably, the energy conversion system is designed in the form of a photovoltaic system which converts solar energy into electrical energy. Further preferably, the consumer constitutes a household of a house.

Preferably, for equalizing the charge state of charge of the battery modules, each identified battery module of which the time of discharge occurs during the first day, is discharged via its associated load resistor until its state of charge corresponds to a lowest state of charge of the battery modules or is equal to a lowest state of charge of other battery modules.

In a preferred refinement of the present invention, the first time is 12 p.m. Alternatively, the first time is in a first period extending symmetrically around 12 p.m. In particular, the first period comprises a natural number of hours between 1 and 6.

In a preferred refinement of the present invention, a previously described method comprises a fourth and fifth step. The fourth step comprises carrying out an online retrieval of weather data taking place at a second time occurring during the first day before the first time. The fifth step comprises determining the first amount of energy, based on the weather data. As a result, an estimation of the first amount of energy, which constitutes an amount of electrical energy which may be provided daily by the energy conversion system to the battery, takes place in a simple manner.

In a preferred refinement of the present invention, the second and third steps of a previously described method respectively comprise a first and second substep. The first substep of the second step comprises a determination, which is to be carried out for each battery module or each identified battery module, of a first portion of the first amount of energy which is suppliable to the respective battery module, based on the first amount of energy and a number of battery modules. The first substep of the second step furthermore comprises a determination, which is to be carried out for each battery module or each identified battery module, of a second portion of the second amount of energy to be supplied by the respective battery module, based on the second amount of energy and the number of battery modules. The first substep of the second step furthermore comprises a determination, which is to be carried out for each battery module or each identified battery module, of an amount of energy stored at the first time in the respective battery module, based on the state of charge of the respective battery module occurring at the first time. The second substep of the second step also comprises a determination of an excess amount of energy, which is to be carried out for each battery module or each identified battery module. The excess amount of energy of each battery module or each identified battery module is to be determined as the difference between the second portion of the second amount of energy to be supplied to the respective battery module, and a sum of the first portion of the first amount of energy which is suppliable to the respective battery module and the amount of energy stored in the respective battery module at the first time. The first substep of the third step comprises selecting the time of discharge of each identified battery module of which the excess amount of energy is positive, as a time occurring during the first day. The second substep of the third step comprises shifting the time of discharge of each identified battery module of which the excess amount of energy is equal to zero or is negative, to a day following the first day. In this way, an algorithm may be provided, by means of which it may be calculated, for each identified battery module, whether discharging of the respective battery module during the first day via the associated load resistor makes sense in energy terms. If the excess energy determined for an identified battery module is positive, discharging of the respective battery modules taking place during the first day makes sense in energy terms, since this excess energy is otherwise either not needed and is thus not used at all, or is fed in under poor conditions. If the excess energy determined for an identified battery module is equal to zero or is negative, discharging of the respective battery module during the first day does not make sense in energy terms. The reason for this is that if the excess energy determined for an identified battery module is equal to zero or is negative, an amount of electrical energy which is available to the respective battery module during the first day is too small or is just sufficient.

In a preferred refinement of the present invention, the second step of a previously described method comprises a third substep, and the third step of a corresponding method comprises a third and fourth substep. The third substep of the second step comprises comparing the state of charge of each identified battery module occurring at the first time with a first limit value of the state of charge, which in particular is 0.7. The third substep of the third step comprises selecting the time of discharge of each identified battery module of which the state of charge occurring at the first time exceeds the first limit value of the state of charge, as a time occurring during the first day. The fourth sub step of the third step comprises shifting the time of discharge of each identified battery module of which the state of charge occurring at the first time reaches or exceeds the first limit value of the state of charge, to a day following the first day. In this way, each identified battery module which is to be discharged during the first day via its associated load resistor, is detected without an online retrieval of weather data being necessary. If an identified battery module has a state of charge above, for example, 0.7 during the first day, for example, already at noon or in the early afternoon, this battery module is discharged during the first day via its associated load resistor. The reason for this is that a probability with which this battery module is completely charged during the first day is very high. If an identified battery module has a state of charge above, for example, 0.7 during the first day, for example, only at 7 p.m., the time of discharge of this battery module is shifted to a day following the first day. The reason for this is that a probability with which this battery module is completely charged during the first day is very low.

In a preferred refinement of the present invention, a previously described method comprises a sixth and seventh step. The sixth step comprises determining, during each day, a second period of time of a third amount of energy which is supplied during the respective day by the battery to the consumer. The first period of time is immediately before the first day and comprises at least two consecutive days. The seventh step comprises determining the second amount of energy, based on each determined third amount of energy. In this way, an estimation of the second amount of energy takes place as a function of amounts of energy which were respectively actually consumed by the consumer during a previous day. Alternatively, the second amount of energy may be a manually set value of the energy conversion system for the first day.

In a preferred refinement of the present invention, the second step of a previously described method comprises a fourth and fifth substep, and the third step of the corresponding method comprises a fifth and sixth substep. The fourth substep of the second step comprises comparing the second or each third amount of energy with a first limit value of the amount of energy. The fifth sub step of the second step comprises carrying out the first and the second sub steps of the second step if the second or each third amount of energy exceeds the second limit value of the amount of energy. Alternatively, the fifth substep of the second step comprises carrying out the third sub step of the second step if the second or each third amount of energy exceeds the first limit value of the amount of energy. The fifth sub step of the third step comprises selecting the time of discharge of each identified battery module as a time occurring during the first day, if the second or each third amount of energy reaches or falls below the first limit value of the amount of energy. The sixth substep of the third step comprises carrying out the first and second substeps of the third step if the second or each third amount of energy exceeds the first limit value of the amount of energy. Alternatively, the sixth sub step of the third step comprises carrying out the third and fourth substeps of the third step if the second or each third amount of energy exceeds the first limit value of the amount of energy. In a case in which the consumer constitutes the household of a house, the first limit value of the amount of energy may represent a maximum amount of energy which is used daily by the household during a period of time during which the residents of the house are on vacation. Thus, based on the comparison according to the fourth sub step of the second step, it may be determined whether the residents of the house are on vacation. If the residents of the house are on vacation, each identified battery module is detected as a battery module of which the time of discharge occurs during the first day without an online retrieval of weather data being necessary. In this way, it is achieved that an optimal storage capacity of the battery is available if the residents are again in the house and use the battery fully.

Advantageously, in a previously described method, it is that for equalizing the states of charge of the battery modules of the battery, each battery module is discharged at a time of discharge which is favorable in terms of energy, via its associated load resistor. As a result, for equalizing states of charge of the battery modules, each of the battery modules may be discharged more frequently than is otherwise customary, via its associated load resistor. In other words, equalizing the states of charge of the battery modules of the battery may be carried out more frequently than is otherwise customary. As a result, the storage capacity of the battery is better utilized.

In a preferred refinement of the present invention, the first step of a previously described method comprises a first detection to be carried out at a third time occurring before the first time or occurring during the first day after the first time. By means of the first detection, each of the battery modules is detected for which a first difference associated with said battery module, between a voltage present at the respective battery module at the third time, and a voltage present at another of the battery modules at the third time, exceeds a first voltage limit value. In particular, the first voltage limit value is 100 mV. Alternatively or in addition, by means of the first detection, each of the battery modules is detected which has experienced a number of charge and discharge cycles exceeding a first numerical limit value, since a time at which the respective battery module was last discharged via its associated load resistor, up to the third time. Each battery module detected by means of the first detection respectively corresponds to one of the identified battery modules which is to be discharged via its associated load resistor.

In a preferred refinement of the present invention, the third time is a time occurring during a day immediately before the first day, at which each battery module has a state of charge which exceeds a second limit value of the state of charge. In particular, the second limit value of the state of charge is 0.9.

In this case, it is to be taken into account that each battery module has a voltage-state of charge characteristic curve of which the slope is highly dependent on a value range in which the state of charge of the respective battery module lies. Such a characteristic curve indicates a profile of a voltage present at one of the battery modules, as a function of a state of charge of the respective battery module. Each battery module may have a state of charge which is between 0 and 1. For low states of charge which, for example, are below 0.15, and for high states of charge which, for example, are above 0.9, the characteristic curve of each battery module has a steep slope. For medium states of charge which, for example, are between 0.15 and 0.9, the characteristic curve of each battery module has a relatively gradual slope. This means that for low and high states of charge, a predefined change in a state of charge of each battery module results in a change in a voltage present at the respective battery module which is significantly greater than a change in this voltage which occurs for medium states of charge.

In a previously described method, for each battery module, the first difference associated with said battery module is preferably measured at a time at which each battery module has a high state of charge which is above 0.9. In this way, each battery module which is to be discharged via its associated load resistor is detected with a very high degree of probability. The reason for this is that at high states of charge of the battery modules, even small differences between the states of charge of the battery modules result in very large and therefore also very precisely measurable differences between the voltages present at the battery modules.

In a preferred refinement of the present invention, a previously described method comprises an eighth and a ninth step. The eighth step comprises a second detection to be carried out at a fourth time occurring during the first day. By means of the second detection, each battery module is detected for which a second difference associated with said battery module, between a voltage present at the respective battery module at the fourth time, and a voltage present at another of the battery modules at the fourth time, exceeds a second voltage limit value. The second voltage limit value is greater than the first voltage limit value. Alternatively or in addition, by means of the second detection, each battery module is detected which has experienced a number of charge and discharge cycles exceeding a second numerical limit value, since a time at which the respective battery module was last discharged via the associated load resistor, up to the fourth time. The second numerical limit value is greater than the first numerical limit value. The ninth step comprises selecting, for each battery module detected by means of the second detection, a time of discharge occurring during the first day, at which the respective battery module was discharged via its associated load resistor. By means of the second detection, each battery module of which the time of discharge was already shifted once or a plurality of times during at least one day before the first day, and which therefore has a critically high value of the second difference associated with said battery module, and/or of the number of charge and discharge cycles experienced, may be reliably detected. According to the ninth step, discharging of each battery module detected by means of the second detection is then forcedly carried out during the first day. In this way, operating reliability of the battery is increased.

According to a preferred refinement of the present invention, the third step of a of a previously described method comprises a seventh sub step. The seventh sub step of the third step comprises selecting the time of discharge of each battery module which is to be discharged during the first day via its associated load resistor, as a time which occurs during the first day in a first state of the battery. In the first state of the battery, each battery module has a state of charge which exceeds the second limit value of the state of charge or which lies in a first value range of the state of charge which comprises a value of the state of charge of 0.5. The second limit value of the state of charge is in particular 0.9. The value range of the state of charge extends in particular between 0.15 and 0.9.

In a previously described method, during the first state of the battery, each battery module preferably has a state of charge which is above 0.9 and which is therefore a high state of charge. As previously mentioned, the slope of the voltage-states of charge characteristic curve of each battery module occurring for high states of charge is very steep. In such a case, when discharging the battery modules to be discharged during the first state via the associated load resistors, a measurement of voltages present at the battery modules may be carried out. Since the slope of the previously described characteristic curve of each battery module is very steep during this measurement, even small differences between the states of charge of the battery modules result in very large differences between the voltages present at the battery modules. As a result, during this measurement, a time, at which a voltage present at a battery module which is discharging via the associated load resistor corresponds to a smallest of the voltages present at the battery modules or is equal to a smallest of the voltages present at other battery modules, may be very precisely determined. In other words, based on this measurement, a discharge period of the battery modules to be discharged during the first day via the associated load resistors may be very precisely determined.

Preferably, a previously described method comprises a tenth and eleventh step. The tenth step comprises a determination, to be carried out for each battery module of which the time of discharge occurs during the first day, of a third difference associated with each respective battery module. Each third difference associated with such a battery module is a difference between a voltage present at the respective battery module at a fifth time and a voltage present at another of the battery modules at the fifth time. The fifth time is a time occurring during the first day, at which each battery module which is to be discharged during the first day via its associated load resistor has already been discharged, and at which a state of charge of each battery module exceeds the second limit value of the state of charge, which is in particular 0.9. The eleventh step comprises a comparison, to be carried out for each battery module which has a time of discharge which occurs during the first day, between each third difference associated with the respective battery module and the first voltage limit value, which is in particular 100 mV. By means of the comparison, for each battery module of which the time of discharge occurs during the first day, it may be determined whether a voltage present at the respective battery module at the fifth time corresponds to a smallest of the voltages present at the battery modules, or is equal to a smallest of the voltages present at other battery modules. In other words, by means of the comparison, it may be determined, for each battery module of which the time of discharge occurs during the first day, whether discharging of the respective battery module carried out during the first day via the associated load resistor has achieved the desired effect. Carrying out this comparison is then important primarily if each battery module to be discharged during the first day via the associated load resistor was discharged at a time occurring during the first day, at which each battery module has a state of charge which is between 0.15 and 0.9 and which is therefore a medium state of charge. As has already been previously mentioned, the slope of the voltage-states of charge characteristic curve of each battery module occurring in the case of medium states of charge is gradual, so that large differences between the states of charge of the battery modules result in small differences between the voltages present at the battery modules.

A further aspect of the present invention relates to an apparatus for carrying out a previously described method. In this case, the apparatus comprises a detection unit, an evaluation unit, and a control unit. Furthermore, one of a plurality of switches which are controllable by means of the control unit is respectively associated with each battery module, via which the respective battery module is connectable in parallel with its associated load resistor. The detection unit is designed to detect parameter values of at least one operating parameter of each battery module and to provide it to the evaluation unit. The evaluation unit is designed to identify each of the battery modules which is to be discharged via its associated load resistor, based on the provided parameter values. The evaluation unit is furthermore designed to determine the state of charge of each battery module or each identified battery module occurring at the first time, and/or the first amount of energy, and/or the second amount of energy, based on the provided parameter values and/or additional data. The evaluation unit is furthermore designed to carry out each first evaluation associated with a battery module or an identified battery module. Furthermore, the evaluation unit is designed to determine, for each identified battery module, whether the time of discharge of said battery module occurs during the first day, based on the first evaluation associated with said battery module. Furthermore, the evaluation unit is designed to generate, for each identified battery module of which the time of discharge occurs during the first day, a control signal associated with the respective battery module, at the time of discharge of the respective battery module, and to provide it to the control unit. In the case of the presence of each control signal associated with an identified battery module, the control unit is designed to close the switch associated with the respective identified battery module for one discharge period.

BRIEF DESCRIPTION OF THE DRAWINGS

Exemplary embodiments of the present invention will be described in detail below with reference to the accompanying drawings. Identical reference characters are used in each case for identical components and parameters. Each component and each parameter are respectively introduced once, and in the case of repetition, they are respectively treated as already being known, irrespective of the drawing or the exemplary embodiment to which a respectively corresponding portion of the description refers, in which the corresponding component or the corresponding parameter repeatedly occurs. In the drawings.

DETAILED DESCRIPTION

Figure 1:
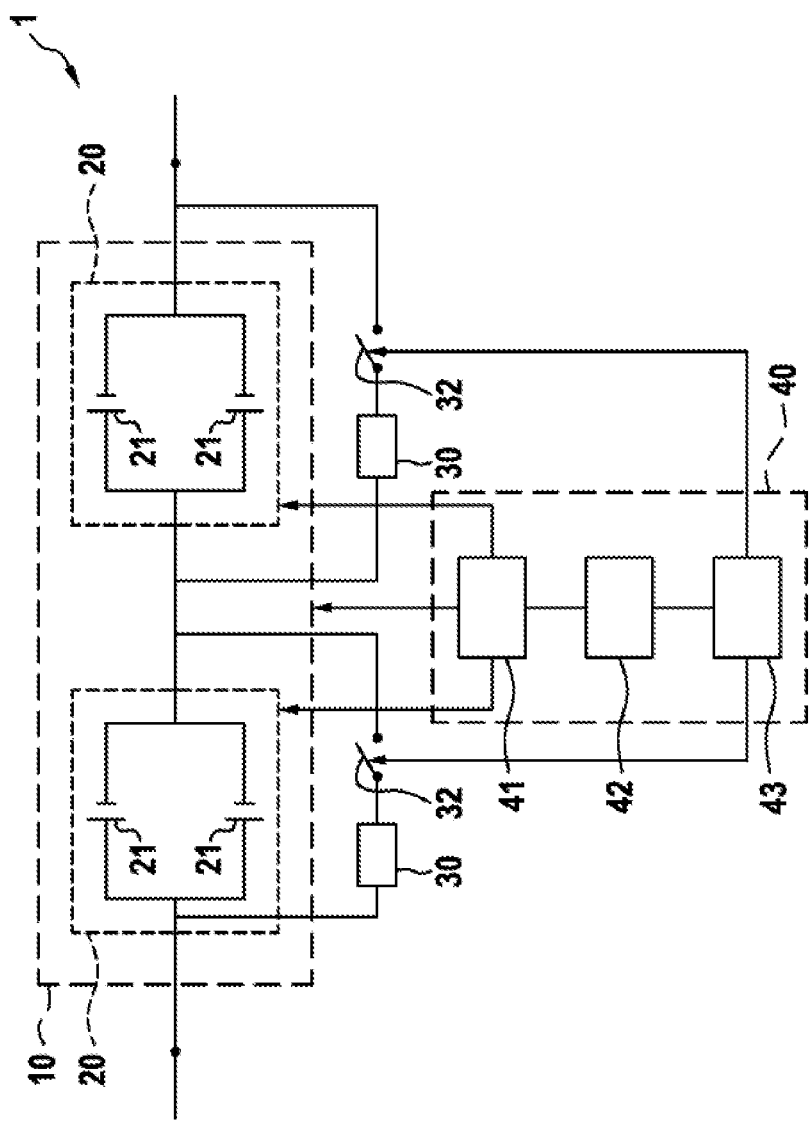
FIG. 1 shows an arrangement including a battery having a plurality of battery modules connected in series, and an apparatus designed according to a first embodiment of the invention, for equalizing states of charge of the battery modules.

FIG. 1 shows an arrangement 1 including a battery 10 having a plurality of battery modules 20 connected in series. To simplify the depiction, in FIG. 1, only two of the battery modules 20 have been depicted by way of example. Each of the battery modules 20 comprises a plurality of battery cells 21 which are connected in parallel with one other. To simplify the depiction, in FIG. 1, only two battery cells 21 per battery module 20 have been depicted by way of example. The battery 10 is provided to supply a consumer (not depicted) with electrical energy, and to store electrical energy which is generated by a stationary energy conversion system (not depicted) by converting renewable energy. Here, for example, the consumer constitutes the household of a house. The stationary energy conversion system is, for example, a photovoltaic system which converts solar energy into electrical energy.

The arrangement 1 comprises a plurality of load resistors 30 associated with one of the battery modules 20 in each case, and a plurality of switches 32 associated with one of the battery modules 20 in each case. Each of the switches 32 may be designed in the form of a MOSFET. To simplify the depiction, in FIG. 1, only the two of the load resistors 30 and the switches 32 associated with the two depicted battery modules 20 are depicted. Each battery module 20 is switchable in parallel with its associated load resistor 30 via the switch 32 associated with said battery module. For equalizing states of charge of the battery modules 20, each battery module 20 may be discharged via its associated load resistor 30.

The arrangement 1 comprises an apparatus 40 for equalizing the states of charge of the battery modules 20 which is designed according to a first embodiment of the present invention.

The apparatus 40 comprises a detection unit 41, an evaluation unit 42, and a control unit 43. The detection unit 41 is designed to detect parameter values of at least one operating parameter of each battery module 20 and additional parameter values of at least one additional operating parameter of the battery 10, and to provide them to the evaluation unit 42.

The parameter values comprise first parameter values which contain a value, occurring at a first time of a first day, of each voltage present at one of the battery modules 20. The evaluation unit 42 is designed to determine a state of charge of each battery module 20 occurring at the first time, based on the first parameter values. The first time is, for example, 12 p.m. or is in a first period of time extending symmetrically around 12 p.m. which, for example, comprises a natural number of hours between 1 and 6.

Alternatively or in addition, the evaluation unit 42 is designed to determine a first amount of electrical energy which is expected to be suppliable during the first day by the energy conversion system to the battery 10, based on additional data. For this purpose, the evaluation unit 42 comprises a communication interface (not shown) via which the evaluation unit 42 is connectable to a communication network (not shown), for example, the Internet. The evaluation unit 42 is furthermore designed to retrieve weather data via the communication interface, at a second time occurring during the first day before the first time, and to determine the first amount of energy, based on the weather data. The weather data constitute at least a portion of the additional data.

Alternatively or in addition, the evaluation unit 42 is designed to determine a second amount of energy which is expected to be supplied by the battery 10 to the consumer during the first day, based on the additional data. In this case, the additional parameter values comprise first additional parameter values, which constitute at least a portion of the additional data, and which contain a plurality of values of a voltage present at the battery 10 and of a current flowing through the battery 10, occurring during each day of a second period of time. The second period of time comprises at least two consecutive days and is immediately before the first day. Furthermore, the evaluation unit 42 is designed to determine each third amount of energy which is supplied by the battery 10 to the consumer during a day in the second period of time, based on the additional first parameter values. In this case, the evaluation unit 42 is furthermore designed to determine the second amount of energy, based on each third amount of energy, in particular as an arithmetic average of the third amounts of energy.

The parameter values comprise second parameter values which contain a value occurring at a third time, of each voltage present at one of the battery modules 20. In this case, the evaluation unit 41 is designed to detect each of the battery modules 20 for which a first difference occurring at the third time, between the voltage present at the respective battery module 20 and the voltage present at another of the battery modules 20, exceeds a first voltage limit value, based on the second parameter values. In particular, the first voltage limit value is 100 mV. The evaluation unit 41 is furthermore designed to identify each battery module 20 detected based on the second parameter values as a battery module 20 which is to be discharged via its associated load resistor 30 for equalizing the states of charge of the battery modules 20.

Alternatively or in addition, the parameter values comprise third parameter values. The third parameter values contain a value, occurring at a third time, of each number of charge and discharge cycles which one of the battery modules 20 has experienced since a time at which the respective battery module 20 was last discharged via its associated load resistor 30, up to the third time. In this case, the evaluation unit 42 is designed to detect each of the battery modules 20 for which the experienced number of charge and discharge cycles exceeds a first numerical limit value, based on the third parameter values. The evaluation unit 41 is furthermore designed to identify each battery module 20 detected based on the third parameter values as a battery module 20 which is to be discharged via its associated load resistor 30 for equalizing the states of charge of the battery modules 20.

The evaluation unit 42 is furthermore designed to determine, for each battery module 20, a first portion of the first amount of energy which is suppliable to said battery module, based on the first amount of energy and a number of battery modules 20. The evaluation unit 42 is furthermore designed to determine, for each battery module 20, a second portion of the second amount of energy to be supplied by said battery module, based on the second amount of energy and the number of battery modules. The evaluation unit 42 is furthermore designed to determine, for each battery module 20, an amount of energy stored in said battery module at the first time, based on its state of charge occurring at the first time. The evaluation unit 42 is furthermore designed to determine, for each battery module 20, an excess amount of energy as the difference, between the second portion to be supplied by said battery module, and a sum of the first portion which is suppliable to said battery module and the amount of energy stored in said battery module at the first time.

The evaluation unit 42 is furthermore designed to select a time of discharge of each identified battery module 20 of which the excess amount of energy is positive, as a time occurring during the first day. The evaluation unit 42 is furthermore designed to shift the time of discharge of each identified battery module 20 of which the excess amount of energy is equal to zero or is negative to a day following the first day.

Alternatively, the evaluation unit 42 is designed to select the time of discharge of each identified battery module 20 of which the state of charge occurring at the first time exceeds a first limit value of the state of charge of, for example, 0.7, as a time occurring during the first day. In this case, the evaluation unit 42 is furthermore designed to shift the time of discharge of each identified battery module 20 of which the state of charge occurring at the first time reaches or falls below the first limit value of the state of charge, to a day following the first day.

Alternatively or in addition, the evaluation unit 42 is designed to select the time of discharge of each identified battery module 20 as a time occurring during the first day, if the second or each third amount of energy reaches or falls below a first limit value of the amount of energy. Furthermore, the evaluation unit is preferably designed to determine the time of discharge of each identified battery module 20, by means of the excess amount of energy or the state of charge of the respective battery module 20 occurring at the first time, in a manner described above, if the second or each third amount of energy exceeds the first limit value of the amount of energy.

The evaluation unit 42 is furthermore designed to select the time of discharge of each battery module 20 which is to be discharged during the first day via its associated load resistor 30, as a time which occurs during the first day in a first state of the battery 10. In the first state of the battery 10, each battery module 20 has a state of charge which exceeds a second limit value of the state of charge of, for example, 0.9.

For each identified battery module 20 of which the time of discharge occurs during the first day, the evaluation unit 42 is furthermore designed to generate a control signal associated with the respective battery module 20, at the time of discharge of the respective module 20, and to provide it to the control unit 43. In the case of the presence of each control signal associated with an identified battery module 20, the control unit 43 is designed to close the switch 32 associated with the respective battery module 20 for one discharge period. Each discharge period of one of the identified battery modules 20 occurring during the first day is selected in such a way that said battery module is discharged via the associated load resistor 30 until its state of charge corresponds to a lowest state of charge of the battery modules 20 or is equal to a lowest state of charge of other battery modules 20.

Figure 2:
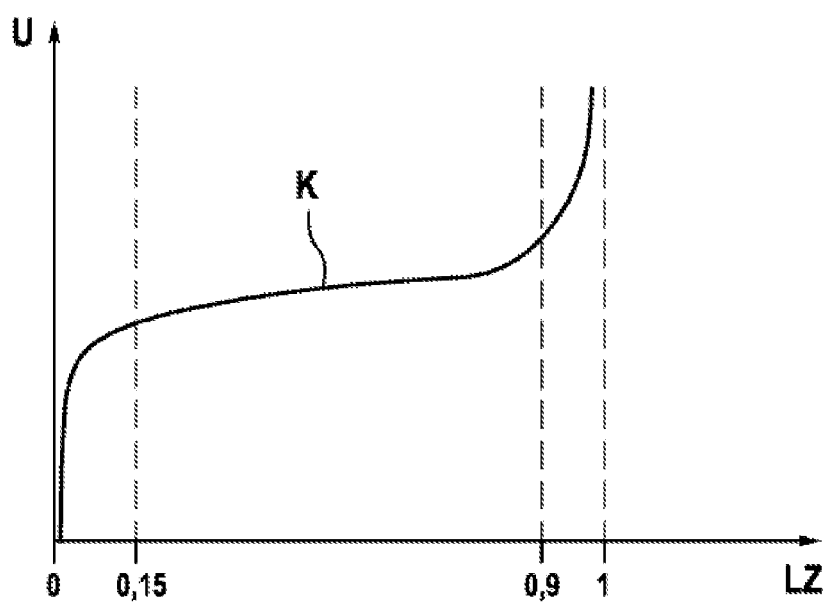
FIG. 2 shows a voltage-states of charge characteristic curve which is characteristic of each of the battery modules of the battery.

The detection unit 41, the evaluation unit 42, and the control unit may be jointly integrated into the battery 10 or energy conversion system. Alternatively, the evaluation unit 42 may be a web server which is not integrated into the battery 10 or the energy conversion system, and which is connectable with the detection unit 41 and the control unit 43 via a communication interface designed, for example, in the form of a web interface. In this case, it is to be taken into account that each battery module 20 has a voltage-state of charge characteristic curve K of which the slope is highly dependent on a value range in which the state of charge of the respective battery modules 20 lies. Such a characteristic curve K is depicted in FIG. 2 and indicates a curve of a voltage present at one of the battery modules 20, as a function of a state of charge of the respective battery module 20. In FIG. 2, an axis which specifies voltage values is indicated by U. In FIG. 2, an axis which specifies state of charge values is indicated by LZ. Each battery module 20 can have a state of charge between 0 and 1. It is apparent from FIG. 2 that the characteristic curve K of each battery module 20 has a very steep slope for low states of charge which, for example, are below 0.15, and for high states of charge which, for example, are above 0.9. If is furthermore apparent from FIG. 2 that the characteristic curve K of each battery module 20 has a relatively gradual slope for medium states of charge which, for example, are between 0.15 and 0.9. This means that for low and high states of charge, a predefined change in a state of charge of each battery module 20 results in a change in the voltage present at the respective battery module 20 which is significantly greater than a corresponding change which occurs for medium states of charge.

In the first state of the battery 10, each battery module 20 has a state of charge which is in particular above 0.9 and which is therefore a high state of charge. Since, in such a case, the slope of the characteristic curve K of each battery module 20 is very steep, when discharging the battery modules 20 to be discharged during the first state via the associated load resistors 30, a precise measurement of voltages present at the battery modules 20 may be carried out by means of the detection unit 41. Since the slope of the characteristic curve K of each battery module 20 is very steep during this measurement, even small differences between the states of charge of the battery modules 20 result in very large differences between the voltages present at the battery modules 20. As a result, based on this measurement, the evaluation unit 42 may very precisely determine a time at which the voltage present at a battery module 20 which is discharging via the associated load resistor 30 corresponds to a smallest of the voltages present at the battery modules 20 or is equal to a smallest of the voltages present at the other battery modules 20. In other words, based on this measurement, the evaluation unit 42 may very precisely determine the discharge period of each battery module 20 to be discharged during the first day via the associated load resistor 30.

In addition to the above written disclosure of the present invention, additional reference is hereby made to the depiction in FIGS. 1 and 2, for further disclosure of the present invention.

The invention claimed is:

1. A method for equalizing states of charge of a plurality of battery modules (20) of a battery (10) which are connected in series, for supplying a consumer with electrical energy and for storing electrical energy which is generated by a stationary energy conversion system via conversion of renewable energy, the method comprising:
    identifying each one of the battery modules (20) which is to be discharged via an associated load resistor (30), for equalizing the states of charge;
    carrying out, for each battery module (20) or each identified battery module (20), a first evaluation, which is associated with said battery module and which takes place at a first time of a first day, of (a) a state of charge of the respective battery module (20) occurring at the first time, (b) a first amount of electrical energy which is expected to be suppliable by the energy conversion system to the battery (10) during the first day, (c) a second amount of electrical energy which is expected to be supplied by the battery (10) to the consumer during the first day or any combination of (a) (b), and (c); and determining, for each identified battery module (20), based on the first evaluation associated with said battery module, whether a time of discharge, at which the respective battery module (20) is discharged via its associated load resistor (30), occurs during the first day.

2. The method as claimed in claim 1, wherein the first time is 12 p.m. or is in a first period of time extending symmetrically around 12 p.m., wherein the first period of time comprises a natural number of hours between 1 and 6.

3. The method as claimed in claim 1, further comprising:
carrying out an online retrieval of weather data at a second time occurring during the first day before the first time; and
determining the first amount of energy, based on the weather data.

4. The method as claimed in claim 1, further comprising:
determining, for each battery module (20) or each identified battery module (20), a first portion of the first amount of energy which is suppliable to said battery module, based on the first amount of energy and a number of battery modules (20),
a second number of the second amount of energy to be supplied by this battery module (20), based on the second amount of energy and the number of battery modules (20), and
an amount of energy stored in this battery module (20) at the first time, based on its state of charge occurring at the first time;
determining, for each battery module (20) or each identified battery module (20), an excess amount of energy as a difference between the second portion to be supplied by the respective battery module (20), and a sum of the first portion which is suppliable to the respective battery module (20) and the amount of energy stored in the respective battery module (20) at the first time;
selecting the time of discharge of each identified battery module (20) of which the excess amount of energy is positive, as a time occurring during the first day; and
shifting the time of discharge of each identified battery module (20) of which the excess amount of energy is equal to zero or is negative to a day following the first day.

5. The method as claimed in claim 1, further comprising:
comparing the state of charge of each identified battery module (20) occurring at the first time with a first limit value of the state of charge, which is in particular 0.7;
selecting the time of discharge of each identified battery module (20) of which the state of charge occurring at the first time exceeds the first limit value of the state of charge, as a time occurring during the first day; and
shifting the time of discharge of each identified battery module (20) of which the state of charge occurring at the first time reaches or falls below the first limit value of the state of charge, to a day following the first day.

6. The method as claimed in claim 1, further comprising:
determining, during each day, a second period of time of a third amount of energy which is supplied during the respective day by the battery (10) to the consumer, and determining the second amount of energy, based on each determined third amount of energy, wherein the second period of time is immediately before the first day and comprises at least two consecutive days.

7. The method as claimed in claim 6, further comprising:
comparing the second or each third amount of energy to a first limit value of the amount of energy; and
selecting the time of discharge of each identified battery module (20) as a time occurring during the first day, if the second or each third amount of energy reaches or falls below the first limit value of the amount of energy; and.

8. The method as claimed in claim 1, further comprising:
carrying out, at a third time occurring before the first time or occurring during the first day after the first time, a first detection of each of the battery modules (20), for which a first difference associated with said battery module, between a voltage present at the respective battery module (20) at the third time and a voltage present at another of the battery modules (20) at the third time, exceeds a first voltage limit value, and/or which has experienced a number of charge and discharge cycles exceeding a first numerical limit value, since a time at which the respective battery module (20) was last discharged via its associated load resistor (30), up to the third time, wherein each battery module (20) detected by means of the first detection respectively corresponds to one of the identified battery modules (20) which is to be discharged via its associated load resistor (30), wherein the first voltage limit value is in particular 100 mV.

9. The method as claimed in claim 8, wherein the third time occurs during a day which is immediately before the first day, and each battery module (20) has a state of charge at the third time which exceeds a second limit value of the state of charge, wherein the second limit value of the state of charge is in particular 0.9.

10. The method as claimed in claim 8, further comprising:
carrying out, at a fourth time occurring during the first day, a second detection of each battery module (20), for which a second difference associated with said battery module, between a voltage present at the respective battery module (20) at the fourth time, and a voltage present at another of the battery modules (20) at the fourth time, exceeds a second voltage limit value which is greater with respect to the first voltage limit value, and/or which has experienced a number of charge and discharge cycles exceeding a second numerical limit value which is greater with respect to the first numerical limit value, since a time at which the respective battery module (20) was last discharged via its associated load resistor (30), up to the fourth time; and
selecting, for each battery module (20) detected by means of the second detection, a time of discharge occurring during the first day, at which the respective battery module (20) is discharged via its associated load resistor.

11. The method as claimed in claim 1, further comprising:
selecting the time of discharge, of each battery module (20) which is to be discharged during the first day via its associated load resistor (30), as a time which occurs during the first day in a first state of the battery (10) in which each battery module (20) has a state of charge which exceeds a second limit value of the state of charge or which lies in a first value range of a state of charge comprising a value of the state of charge of 0.5, wherein the second limit value of the state of charge is in particular 0.9, or the first value range of the state of charge extends in particular between 0.15 and 0.9.

12. An apparatus (40) for carrying out a method as claimed in claim 1, wherein the apparatus (40) comprises a detection unit (41), an evaluation unit (42), and a control unit (43), wherein one of a plurality of switches (32) which are controllable by means of the control unit (43) is respectively associated with each battery module (20), it being possible via said switch to connect the respective battery module (20) in parallel with its associated load resistor (30), wherein the detection unit (41) is designed to detect parameter values of at least one operating parameter of each battery module (20) and to provide them to the evaluation unit (42), wherein the evaluation unit (42) is designed to identify each of the battery modules (20) which is to be discharged via its associated load resistor (30), based on the provided parameter values; to determine the state of charge of each battery module (20) or each identified battery module (20) occurring at the first time, and/or the first amount of energy, and/or the second amount of energy, based on the provided parameter values and/or other data; to carry out each first evaluation associated with a battery module (20) or an identified battery module (20); to determine, for each identified battery module (20), whether its time of discharge occurs during the first day, based on the first evaluation associated with said battery module, and for each identified battery module (20) of which the time of discharge occurs during the first day, to generate a control signal associated with the respective battery module (20) at the time of discharge of the respective battery module (20) and to provide it to the control unit (43), wherein in the case of the presence of each control signal associated with an identified battery module (20), the control unit (43) is designed to close the switch (32) associated with the respective battery module (20) for one discharge period.

\* \* \* \* \*